United States Patent
Jain et al.

(10) Patent No.: US 11,601,496 B1
(45) Date of Patent: Mar. 7, 2023

(54) HYBRID CLOUD SERVICES FOR ENTERPRISE FABRIC

(71) Applicant: Cisco Technology, Inc., San Jose, CA (US)

(72) Inventors: Prakash C. Jain, Fremont, CA (US); Sanjay Kumar Hooda, Pleasanton, CA (US); Marc Portoles Comeras, Mountain View, CA (US); Vinay Saini, Bangalore (IN); Victor Manuel Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/728,657

(22) Filed: Apr. 25, 2022

(51) Int. Cl.
| | |
|---|---|
| *G06F 15/16* | (2006.01) |
| *H04L 67/1001* | (2022.01) |
| *H04L 41/122* | (2022.01) |
| *H04L 67/51* | (2022.01) |
| *H04L 45/76* | (2022.01) |
| *H04L 41/0893* | (2022.01) |

(52) U.S. Cl.
CPC .... *H04L 67/10015* (2022.05); *H04L 41/0893* (2013.01); *H04L 41/122* (2022.05); *H04L 45/76* (2022.05); *H04L 67/51* (2022.05)

(58) Field of Classification Search
CPC ...... H04L 67/10015; H04L 9/40; H04L 67/51
USPC ........................................................ 709/203
See application file for complete search history.

(56) References Cited

U.S. PATENT DOCUMENTS

| | | |
|---|---|---|
| 10,027,546 B1 | 7/2018 | Qin et al. |
| 10,320,609 B1 | 6/2019 | Kumar et al. |
| 10,462,136 B2 * | 10/2019 | Arregoces ............... H04L 63/10 |
| 2011/0261800 A1 | 10/2011 | You et al. |
| 2015/0074741 A1 * | 3/2015 | Janakiraman ......... H04L 63/101 |
| | | 709/225 |
| 2016/0164832 A1 | 6/2016 | Bellagamba et al. |
| 2017/0026417 A1 * | 1/2017 | Ermagan ............. H04L 63/0428 |
| 2019/0132209 A1 | 5/2019 | Hooda et al. |
| 2020/0389426 A1 * | 12/2020 | Enguehard .......... H04L 61/5084 |
| 2022/0182317 A1 * | 6/2022 | Thoria .................... H04L 45/50 |

\* cited by examiner

*Primary Examiner* — Hee Soo Kim
(74) *Attorney, Agent, or Firm* — Lee & Hayes, P.C.

(57) ABSTRACT

This disclosure describes techniques and mechanisms for providing hybrid cloud services for enterprise fabric. The techniques include enhancing an on-demand protocol (e.g., such as LISP) and allowing simplified security and/or firewall service insertion for datacenter servers providing those services. Accordingly, the techniques described herein provide hybrid cloud services that work in disaggregated, distributed, and consistent way, while avoiding complex datacenter network devices (e.g., such running overlay on TOR), replacing and moving the functionality to on demand protocol enabled servers, which intelligently receive the required mappings as well as registers and publishes the service information to intelligently interact with the network.

20 Claims, 7 Drawing Sheets

HYBRID CLOUD SERVICES FOR ENTERPRISE FABRIC

TECHNICAL FIELD

The present disclosure relates generally to the field of computer networking, and more particularly to providing hybrid cloud services for enterprise fabric.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In recent years, enterprise services have increasingly moved to the cloud. Further, growing numbers of enterprise devices connect using overlay based new software defined access (SDA) or software defined network (SDN) architecture need a uniform way of accessing hybrid cloud services (from both private cloud as well as public cloud at the same time). Traditionally, datacenter (DC) servers providing enterprise services usually use a Top-Of-Rack, leaf (TOR) switch to connect to aggregation switches (e.g., spine). Though TOR architecture reduces the cabling requirement and provide faster access, its increases the rack space, cooling requirements and cost/complexity due to the increased switching devices. While datacenter End-Of-Row (EOR) architecture does not require access switches, it increases the wiring requirements and reduces access efficiency. Accordingly, there exists a need to simplify services and server's connectivity without losing access efficiency to apply hybrid cloud services in consistent manner.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure relates generally to the field of computer networking, and more particularly to providing hybrid cloud services for an enterprise fabric.

A method to perform techniques described herein may be implemented by a cloud control plane and may include receiving, from a public cloud site and using an enhanced LISP protocol, first data including first indications of first services, first IP addresses, first SGT bindings, first capabilities, and first datacenter (DC) prefixes and receiving, from a private cloud site and using the enhanced LISP protocol, second data including second indications of second services, second IP addresses, second SGT bindings, second capabilities, and second DC prefixes. The method additionally includes aggregating the first services and the second services based on the first capabilities and the second capabilities. The method may also include storing, in a database, the first IP addresses, the second IP addresses, the first SGT bindings, the second SGT bindings, the first DC prefixes, and the second DC prefixes. The method may further include sending a first service publication to the public cloud site and the private cloud site and sending a second service publication to an access control site associated with a host device.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide-area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In recent years, enterprise services have increasingly moved to the cloud. Further, growing numbers of enterprise devices connect using overlay based new software defined access (SDA) or software defined network (SDN) architecture need a uniform way of accessing hybrid cloud services (from both private cloud as well as public cloud at the same time). Traditionally, datacenter (DC) servers providing enterprise services usually use a TOR, leaf switch to connect to aggregation switches (e.g., spine). Though TOR architecture reduces the cabling requirement and provide faster access, its increases the rack space, cooling requirements and cost/complexity due to the increased switching devices. While datacenter EOR architecture does not require access switches, it increases the wiring requirements and reduces access efficiency. Accordingly, there exists a need to simplify services and server's connectivity without losing access efficiency to apply hybrid cloud services in consistent manner.

This disclosure describes techniques and mechanisms for enabling a hybrid cloud control plane to provide hybrid cloud services for enterprise fabric. In some examples, the cloud control plane may receive, from a public cloud site and using an enhanced LISP protocol, first data including first indications of first services, first IP addresses, first SGT bindings, first capabilities, and first datacenter (DC) prefixes. In some examples, the cloud control plane may receive, from a private cloud site and using the enhanced LISP protocol, second data including second indications of second services, second IP addresses, second SGT bindings, second capabilities, and second DC prefixes. The cloud control plane may aggregate the first services and the second services based on the first capabilities and the second capabilities. The cloud control plane may store, in a database, the first IP addresses, the second IP addresses, the first SGT bindings, the second SGT bindings, the first DC prefixes, and the second DC prefixes. In some examples, the cloud control plane may send a first service publication to the public cloud site and the private cloud site and/or send a second service publication to an access control site associated with a host device.

In some examples, the hybrid cloud control plane comprises a controller. In some examples, the controller comprises a service controller and may be configured to act as a transit site for one or more networks within the system.

In some examples, the hybrid cloud control plane comprises an aggregation component. In some examples, the aggregation component is configured to aggregate one or more service(s) associated with a public cloud site and/or private cloud site based capabilities associated with one or more server(s). The aggregation component may further be configured to add prefix-security group tag (SGT) bindings with endpoint identifier (EID)-to-source Routing Locator (RLOC) (e.g., service-etr) mappings within a database and/or memory of the hybrid cloud control plane.

In some examples, the hybrid cloud control plane comprises a publication component. In some examples, the publication component is configured to send service publication messages to one or more of the public cloud site, the private cloud site, and/or one or more access site(s) associated with a host. For instance, the access site may enable a host to access one or more service(s) at a public cloud site and/or private cloud site. In some examples, the access site may comprise a software defined access (SDA) network, a SDN network, a wireless access network, and/or any other network described herein.

In some examples, the hybrid cloud control plane comprises an identity and security engine (ISE). In some examples, the ISE is configured to receive information associated with endpoint device(s) and/or server(s). In some examples, the information may comprise security indications corresponding to what services the endpoint devices are authorized to access.

In some examples, the border device(s) and/or server(s) may comprise a hardware card, such as a smartNI, or any other suitable card. In some examples, the border device(s) and/or server(s) may comprise xTRs (a device performing the role of egress tunnel router (ETR) and ingress tunnel router (ITR)), data processing units (DPUs), and/or any other suitable forwarding engines.

In this way, a hybrid cloud control plane can provide a centralized, cloud based management and cloud based service-control-plane, which provides, among others, a highly scalable centralized service-control-plane functionality that enables offloading complex control-plane functions from all networking units and provides consistent policy functions to all of them (regardless of type and size). Moreover, the described techniques provide simplified forwarding in servers. That is, by utilizing a pull based protocol (e.g., such as LISP) and including xTRs and/or functionality of border devices on the servers (e.g., such as using DPUs, smartNICs, and/or other forwarding engine), the end-host system that the servers are part of are exposed to the rest of the network as highly disaggregated private/public cloud entities. Accordingly, in this way, services provided by servers are not subject to the aggregation and/or structural limitations of the datacenter/cloud environment they are running in, and can be assimilated into the whole system with consistent rules and policies.

Additionally, the described techniques enable integrated network environments (e.g., such as enterprise SDA, extended access networks, and/or IoT access networks). For instance, other systems and/or servers may treat the cloud control plane as part of a transit site and/or be onboarded as part of a scaled out network design. That is, with the described architecture, these integrated systems may see the services offered by the servers as part of a common flat system, without the need to account for policy exchanges between separate domains as well as without worrying about converging optimized routing paths and/or prefixes with security groups assignments of the servers and/or hosts.

Furthermore, the claimed techniques provide consistent and repeatable service distribution and applications. For instance, the hybrid cloud services and network services such as firewalls may be highly reproduced and scaled, since the cloud services and/or network services may be implemented and replicated at any point of the highly disaggregated architecture described herein and enabled by simplified forwarding (e.g., such as using xTR, DPUs, and/or smartNIC, and an on-demand protocol (e.g., such as LISP or any other suitable pull-based protocol). Accordingly, by utilizing an on-demand protocol architecture (like LISP) having service registration and/or service insertion enhancement for cloud based services and disaggregating the networking units in the public and private cloud and data-centers, the claimed techniques integrate disparate environments such as public and private clouds with Enterprise SDA and extended access networks, under a common set of simplified rules that are reusable in all of them.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
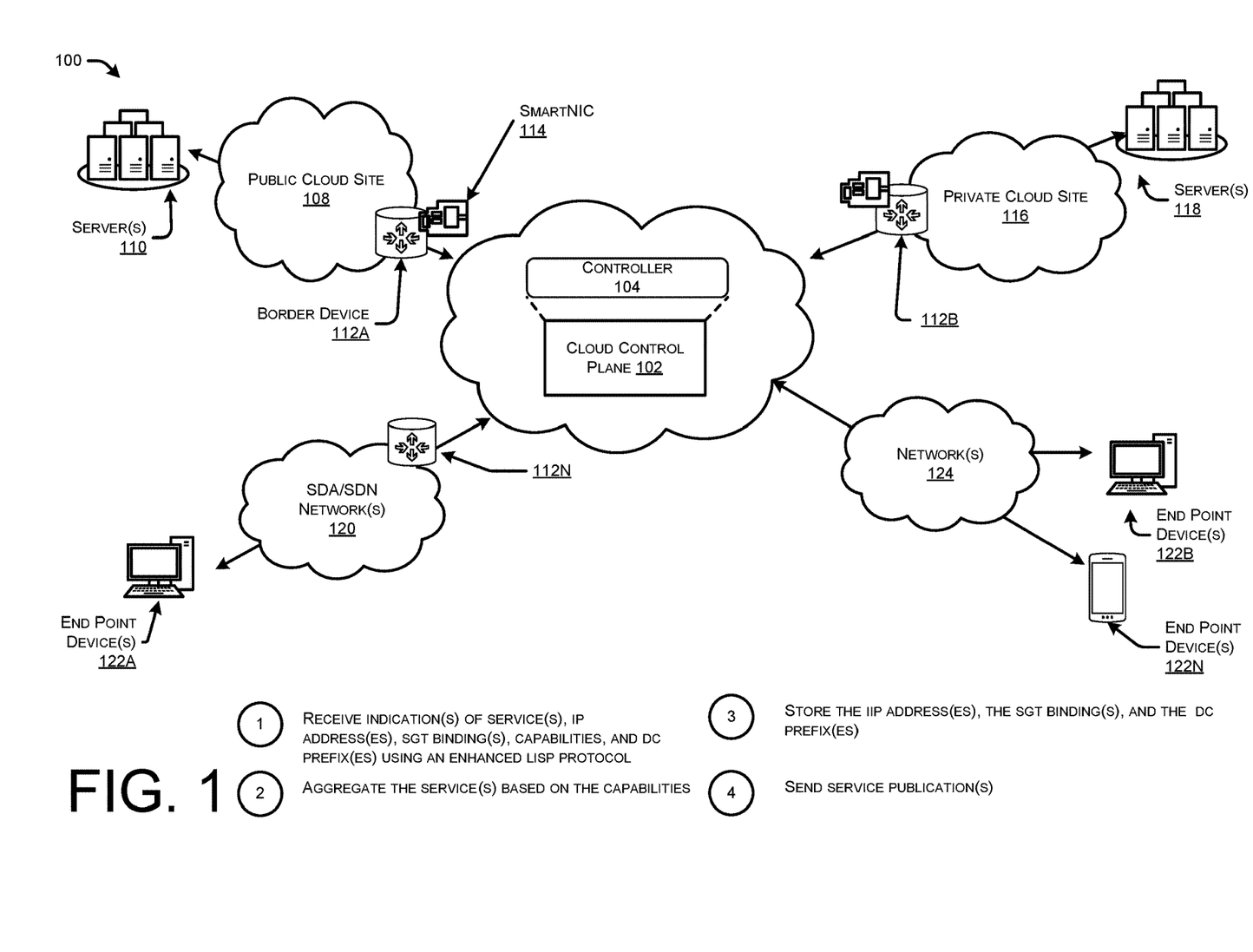
FIG. 1 illustrates a system-architecture diagram of an environment in which a hybrid cloud control plane can provide hybrid cloud services for an enterprise fabric.

FIG. 1 illustrates a system-architecture diagram of an environment 100 in which a hybrid cloud control plane 102 (also referred to herein as "cloud control plane") provides hybrid cloud services for enterprise fabric. For instance, the cloud control plane 102 may be included as part of a hybrid network (e.g., such as an enhanced Locator/ID Separation Protocol (LISP) network, fabric network, or any other suitable type of network). In some examples cloud control plane 102 comprises a controller 104 (also referred to herein as "cloud controller" 104). The controller 104 may comprise a Map-Server/Map-Resolver (MSMR) and, in some examples, may act as a transit site for one or more of the SDA/SDN network 120, network(s) 124, and/or any other network described herein.

In some examples, the environment 100 may include a public cloud site 108 that includes devices housed or located in one or more data centers, such as servers 110. The public cloud site 108 may include one or more networks implemented by any viable communication technology, such as wired and/or wireless modalities and/or technologies. The public cloud site 108 may include any combination of Personal Area Networks (PANs), SDA, SDN, Wide Area Access Networks, Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The public cloud site 108 may include devices, virtual resources, or other nodes that relay packets from one network segment to another by nodes in the computer network. The public cloud site 108 may include multiple devices that utilize the network layer (and/or session layer, transport layer, etc.) in the OSI model for packet forwarding, and/or other layers.

In some examples, the environment 100 may include a private cloud site 116 that includes devices housed or located in one or more data centers, such as servers 118. The private cloud site 118 may include one or more networks implemented by any viable communication technology, such as wired and/or wireless modalities and/or technologies. The public cloud site 108 may include any combination of Personal Area Networks (PANs), SDA, SDN, Wide Area Access Networks, Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The private cloud site 118 may include devices, virtual resources, or other nodes that relay packets from one network segment to another by nodes in the computer network. The private cloud site 118 may include multiple devices that utilize the network layer (and/or session layer, transport layer, etc.) in the OSI model for packet forwarding, and/or other layers.

The one or more server(s) 110 and/or server(s) 118 may be located at physical facilities or buildings located across geographic areas that designated to store networked devices that are part of one or more service network(s). The server(s) 110 and/or server(s) 118 may include various networking devices, as well as redundant or backup components and infrastructure for power supply, data communications connections, environmental controls, and various security devices. In some examples, the server(s) 110 and/or server(s) 118 may include one or more virtual data centers which are a pool or collection of cloud infrastructure resources specifically designed for enterprise needs, and/or for cloud-based service provider needs. Generally, the server(s) 110 and/or server(s) 118 of data centers (physical and/or virtual) may provide basic resources such as processor (CPU), memory (RAM), storage (disk), and networking (bandwidth). However, in some examples the devices in the packet-forwarding network architectures may not be located in explicitly defined data centers, but may be located in other locations or buildings.

In some instances, the system 100 comprises border device(s) 112A and 112B and are included as part of the public cloud site 108 and/or private cloud site 116. The public cloud site 108 and/or private cloud site 116 may generally include, manage, or otherwise be associated with one or more applications or services utilized by users accessing network(s). Network(s) may comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The public cloud site 108 and/or private cloud site 116 may provide any type of application or service for use by users of client devices (not shown). However, in other instances the cloud control plane 102 may be associated with any type of computing device and be used for any purpose. In some examples, the cloud control plane 102 comprises a router, a switch, or any other type of device included in a network architecture.

As illustrated, the border device(s) 112 may comprise functionality including smartNICs 114. In some examples, the border device(s) 112 are configured to implement LISP xTRs and/or borders functionality on the servers (e.g., such as server(s) 110 and/or server(s) 118), such as by using DPUs, smartNICs 114, and/or any other suitable forwarding engine.

As illustrated, the cloud control plane 102 may communicate with one or more end point device(s) 122 via an SDA/SDN network(s) 120 and/or network(s) 124. In some examples, end point device(s) 122 comprise computing device(s), such as user and/or host device(s) (e.g., computers, mobile devices, tablets, etc.).

Network(s) 124 may comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. In some examples, the network(s) 124 may comprise a border device (not shown), such as a border device 112 described above.

At "1", the cloud control plane 102 may receive indication(s) of service(s), IP address(es), SGT binding(s), capabilities, and DC prefix(es) using an enhanced LISP protocol. For instance, the cloud control plane 102 may receiving the indication(s) from one or more of the public cloud site 108 and/or the private cloud site 118.

At "2", the cloud control plane 102 may aggregate the service(s) based on the capabilities. For instance, the cloud control plane 102 may (such as via a MSMR) aggregate the services based on capabilities. The cloud control plane 102 may additionally add the prefix-SGT bindings with EID-to-RLOC (service-etr) mappings in a database and/or memory associated with the cloud control plane 102.

At "3", the cloud control plane 102 may store one or more of the IP address(es), the SGT binding(s), and the DC prefix(es). For instance, the cloud control plane 102 may store the information in one or more databases and/or memory associated with the cloud control plane 102.

At "4", the cloud control plane 102 may send service publication(s). For instance, the cloud control plane may send service publication(s) to one or more of the public cloud site 108, private cloud site 116, SDA/SDN network(s) 120 and/or network(s) 124. In some examples, the service publication(s) may comprise indications of the service(s), the IP address(es), the SGT binding(s), the DC prefix(es), and/or any other suitable information.

Figure 2:
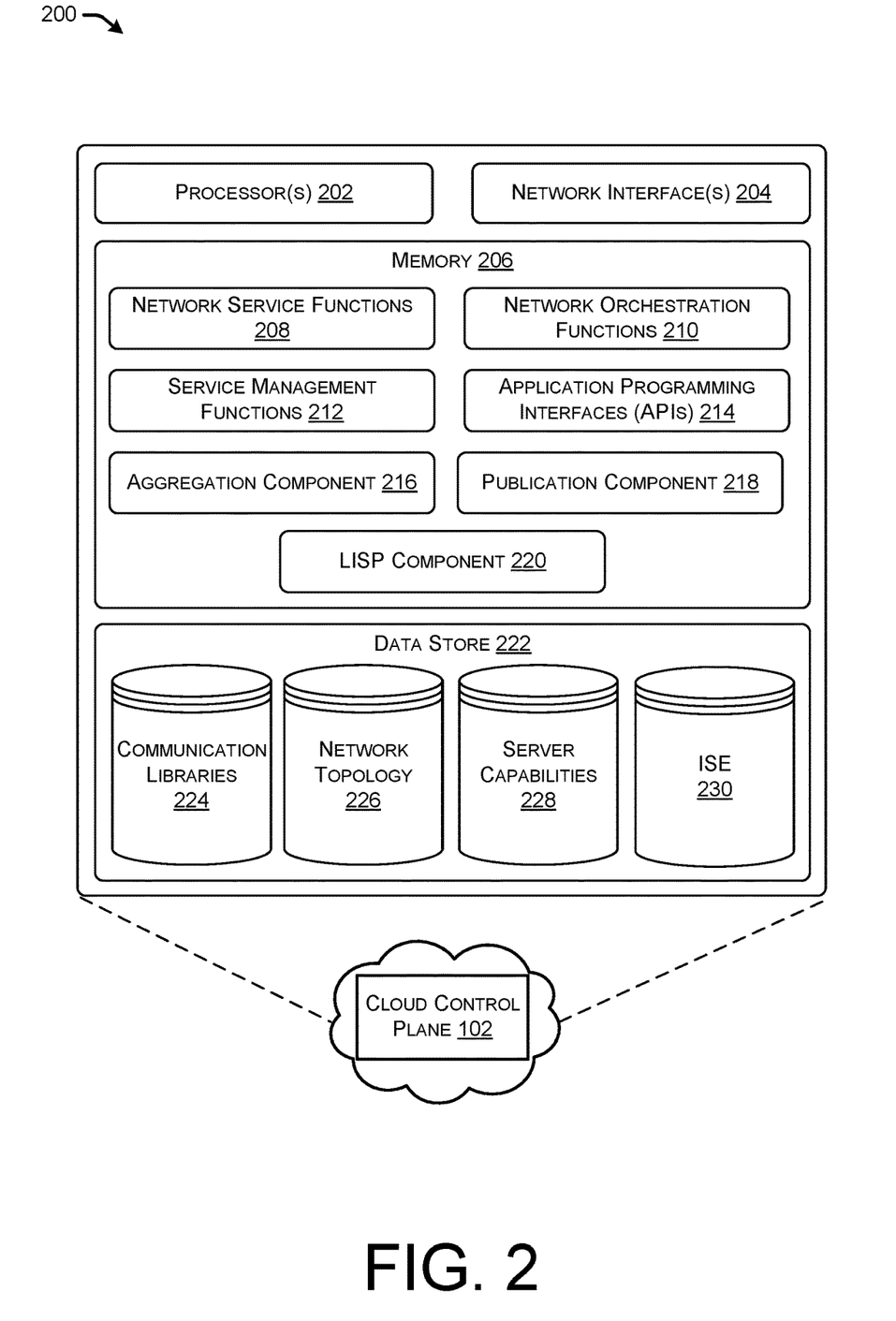
FIG. 2 illustrates a component diagram of an example cloud control plane described in FIG. 1.

FIG. 2 illustrates a component diagram of an example cloud control plane that provides hybrid cloud services for enterprise fabric. In some instances, the cloud control plane 102 may run on one or more computing devices in, or associated with, the system 100 (e.g., a single device or a system of devices). The cloud control plane 102 may comprise a single controller that is running, or multiple instances of a network controller running at least partly at a same time.

Generally, the cloud control plane 102 may include a programmable controller that manages some or all of the control plane activities of the network architecture 102, and manages or monitors the network state using one or more centralized control models. Generally, the cloud control plane 102 may handle at least the functions of (i) receiving, from a public cloud site and using an enhanced LISP protocol, first data including first indications of first services, first IP addresses, first SGT bindings, first capabilities, and first datacenter (DC) prefixes and receiving, from a private cloud site and using the enhanced LISP protocol, second data including second indications of second services, second IP addresses, second SGT bindings, second capabilities, and second DC prefixes; (ii) aggregating the first services and the second services based on the first capabilities and the second capabilities; and (iii) sending a first service publication to the public cloud site and the private cloud site and sending a second service publication to an access control site associated with a host device.

As illustrated, the cloud control plane 102 may include, or run on, one or more hardware processors 202 (processors), one or more devices, configured to execute one or more stored instructions. The processor(s) 202 may comprise one or more cores. Further, the cloud control plane 102 may include or be associated with (e.g., communicatively coupled to) one or more network interfaces 204 configured to provide communications with the end point device(s) 124, server(s) 110, server(s) 118, and other devices, and/or other systems or devices in the system 100 and/or remote from the system 100. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The cloud control plane 102 may also include memory 206, such as computer-readable media, that stores various executable components (e.g., software-based components, firmware-based components, etc.). The memory 206 may generally store components to implement functionality described herein as being performed by the cloud control plane 102. The memory 206 may store one or more network service functions 208, a topology manager to manage a topology of the network architecture, a host tracker to track what network components are hosting which programs or software, a switch manager to manage switches of the network architecture, a process manager, and/or any other type of function performed by the cloud control plane 102.

The cloud control plane 102 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network architecture (configurable), and one or more APIs 214 for communicating with devices in the network architecture and causing various control plane functions to occur.

Further, the cloud control plane 102 may include an aggregation component 216. In some examples, the aggregation component 216 is configured to aggregate one or more service(s) associated with a public cloud site and/or private cloud site based capabilities associated with one or more server(s). The aggregation component may further be configured to add prefix-security group tag (SGT) bindings with endpoint identifier (EID)-to-source Routing Locator (RLOC) (e.g., service-etr) mappings within a database and/or memory of the hybrid cloud control plane.

The cloud control plane 102 may further include a publication component 218. In some examples, the publication component 218 is configured to send service publication messages to one or more of the public cloud site, the private cloud site, and/or one or more access site(s) associated with a host. For instance, the access site may enable a host to access one or more service(s) at a public cloud site and/or private cloud site. In some examples, the access site may comprise a software defined access (SDA) network, a SDN network, a wireless access network, and/or any other network described herein.

The cloud control plane 102 may include a LISP component 220. In some examples, the LISP component is configured to implement a LISP protocol. In other examples, the LISP component is configured to implement any pull-based protocol and/or on demand protocol.

The cloud control plane 102 may further include a data store 222, such as long-term storage, that stores communication libraries 224 for the different communication protocols that the cloud control plane 102 is configured to use or perform. Additionally, the data store 222 may include network topology data 226, such as a model representing the layout of the network components in the network architecture of the hybrid cloud network. The data store 222 may store device capabilities 228 that includes telemetry data indicating computing resource usage and/or availability on the different network components in the network architecture. The device capabilities may further include data indicating available bandwidth, protocols associated with the device, available CPU, delay between nodes, computing capacity, processor architecture, processor type(s), etc.

Additionally, the data store 222 may include an identity and security engine (ISE) 230. The ISE 230 may be configured to receive and store information associated with endpoint device(s) and/or server(s). In some examples, the information may comprise security indications corresponding to what services the endpoint devices are authorized to access.

Figure 3A:
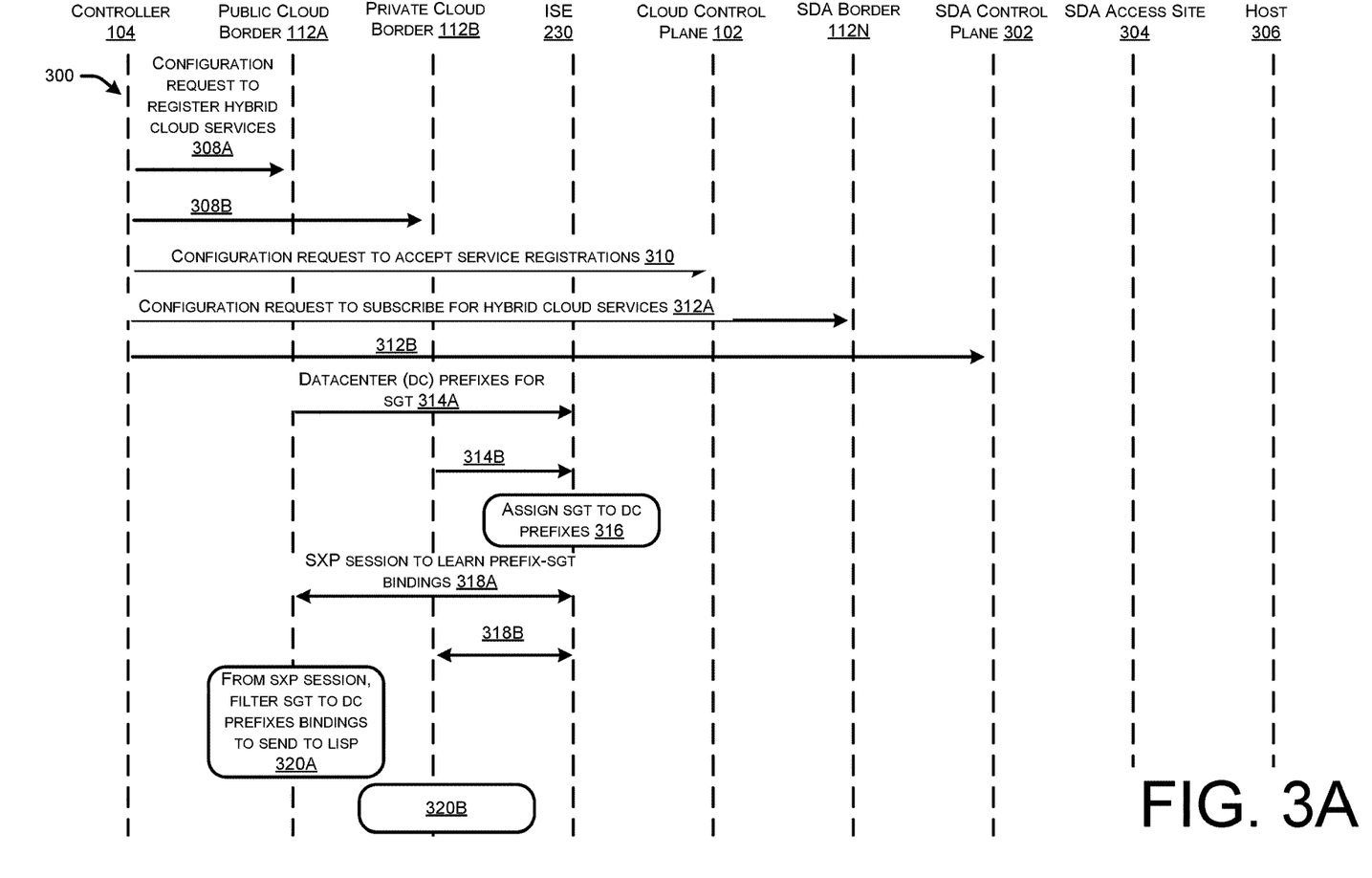
FIG. 3A-3C illustrate a flow diagram of example communications where the system onboards devices, publishes service publications, and enables a host to access remote services.
Figure 3B:
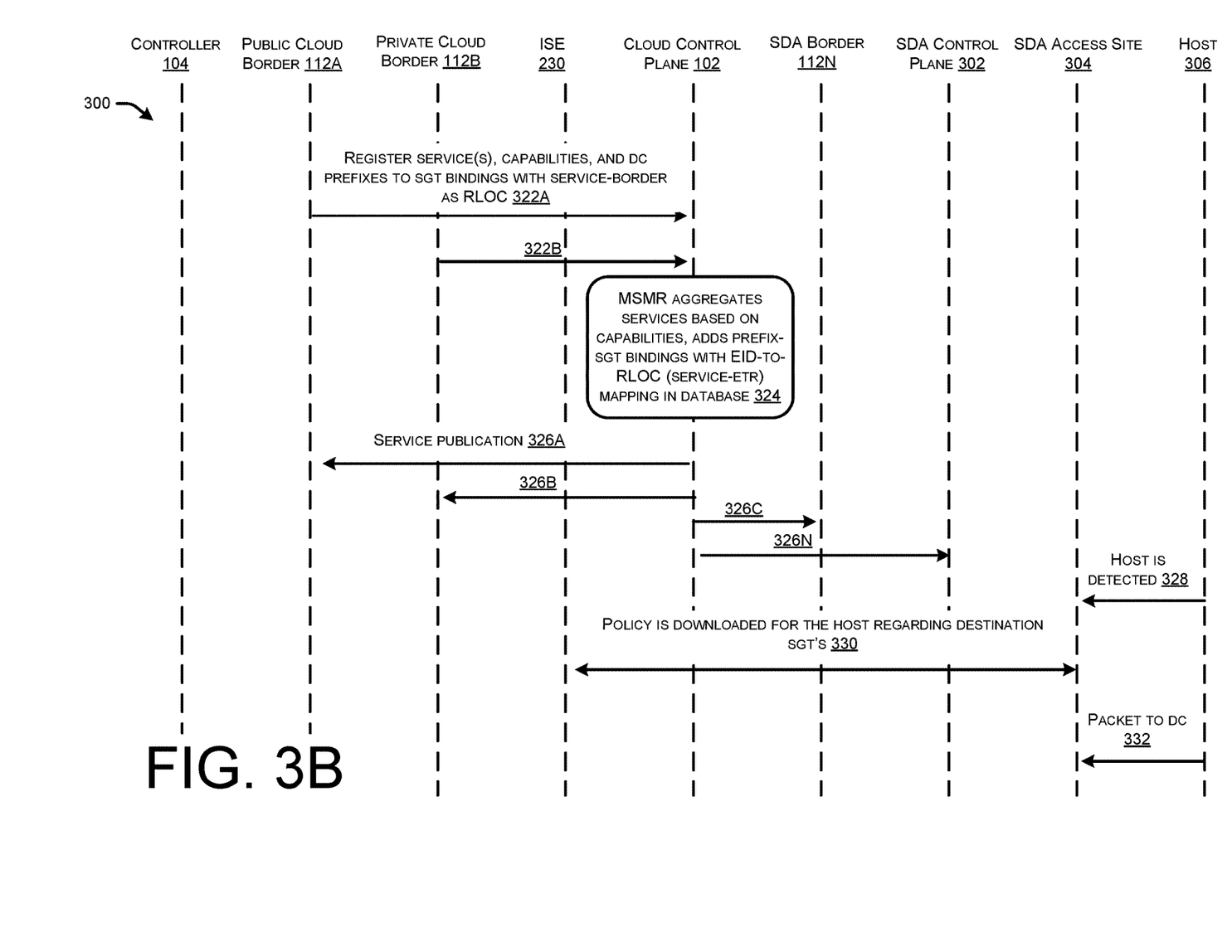
Figure 3C:
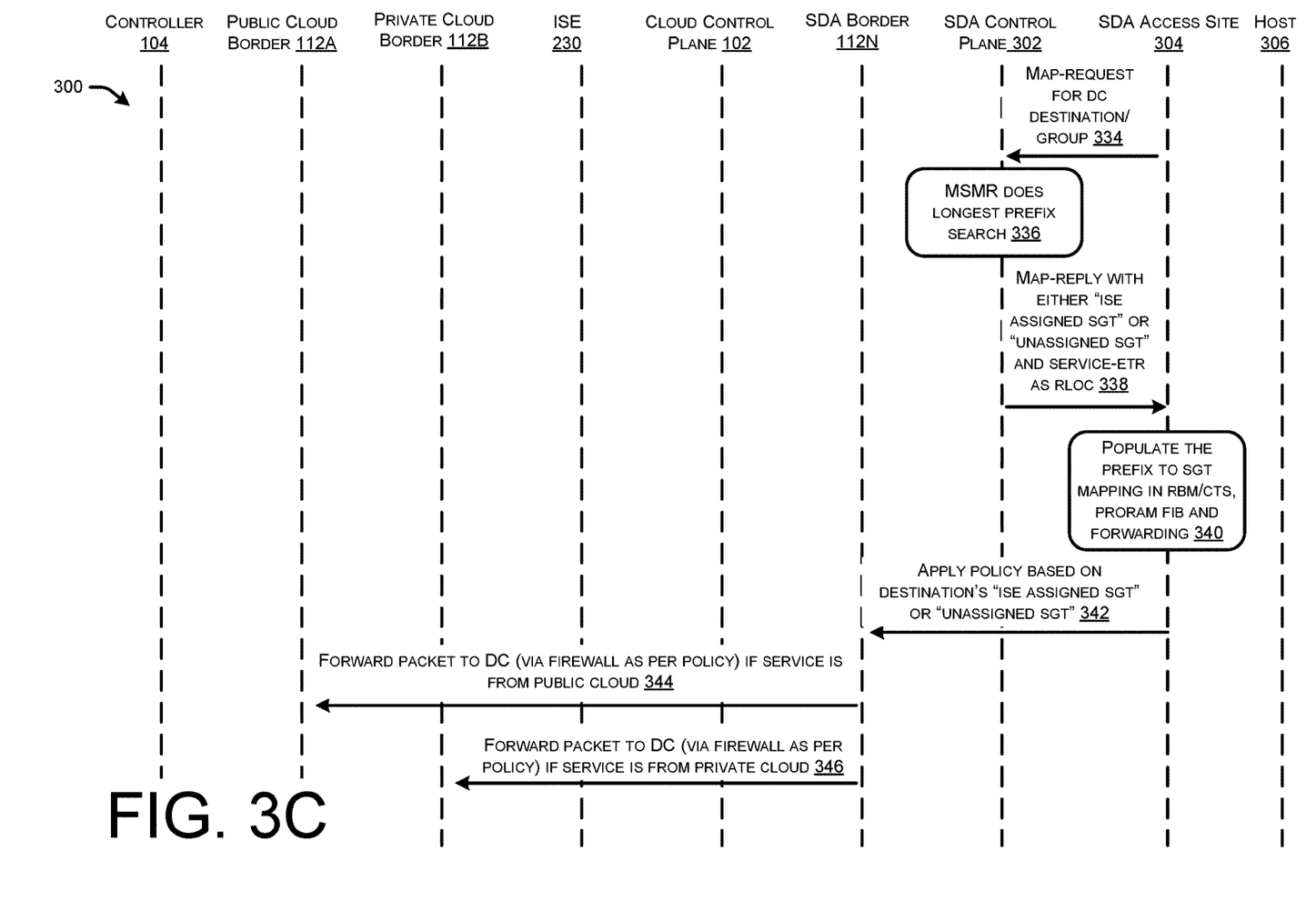

FIGS. 3A-3C illustrate a flow diagram of example communications, where the system onboards devices, publishes service publications, and enables a host to access remote services. In the illustrative example, the network comprises a LISP based SDA enterprise network. As illustrated, the system may include the controller 104, public cloud border 112A associated with a public cloud site, a private cloud border 112B associated with a private cloud site, cloud control plane 102, ISE 230, an SDA border 112N, an SDA control plane 302, and SDA access site 304 and a host 306. In the illustrative example, the SDA border 112N comprises a border device configured with a LISP xTR.

The SDA control plane 302 may comprise a control plane, as described above with regard to FIG. 2. In some examples, the SDA control plane 302 is implemented in a LISP network and/or comprises a MSMR device. In some examples, the SDA access site 304 comprises an access site that enables the host 306 to access one or more service(s) (e.g., such as Google service(s)), via the public cloud site and/or private cloud site described above. In some examples, the host 306 may correspond to a user of a service associated with a datacenter server located at the public cloud site and/or private cloud site.

At 308 (e.g., 308A and 308B), the cloud controller 104 may send configuration request(s) to register hybrid cloud services to one or more of a public cloud border and/or a private cloud border. For instance, the configuration request(s) may be part of onboarding of the public cloud site and/or private cloud site.

At 310, the cloud controller 104 may send configuration request(s) to accept service registrations to the cloud control plane 102.

In some examples, onboarding of the private cloud site and/or public cloud site includes (i) capability registration(s) of server(s) (e.g., such as server(s) 110 and/or server(s) 118), (ii) service insertion registration, and (iii) host and server registration. In some examples, capability registration is used to register the capabilities of a server (service_etr) with the cloud control plane 102. In some examples, cloud control plane registers and/or stores a list of capabilities that a server (e.g., server(s) 110 and/or server(s) 118) is able to perform (e.g., such as encryption, decryption, packet switching, packet inspection, or any other suitable capability and/or protocol).

In some examples, service insertion registration is used to register services that are provided and/or can be provided when using the disaggregated DC servers (e.g., such as server(s) 110 and/or server(s) 118). In some examples, service insertion registration utilizes a service-etr procedure in LISP and may register any type of service (e.g., authentication, firewall service, accounting, storage etc.). In some examples, the cloud control plane may maintain a registry of the services being registered for each DC server.

In some examples, DC server(s) additionally or alternatively register state information associated with the services being provided with the cloud control plane 102. In some examples, an interface associated with an on-demand protocol (e.g., such as LISP service registration interface) may be extended to include station information associated with a service that corresponds to a service site. The state information may be stored by the cloud control plane in memory and/or a database. Accordingly, the cloud control plane may utilize replication in order to scale a service. For instance, when a service from one service site is replicated on another service site, this state information can be published (using the lisp publication interface) and be recreated on the server of the new site. This enables the cloud control plane to auto-scale services in the cloud in a faster manner, without the need for the service sites to coordinate with each other.

In some examples, host and server registration is included as part of the service registration. The host and server registration may comprise registering, with the cloud control plane 102, the IP addresses of the servers (e.g., server(s) 110 and/or server(s) 118) to support networking. This allows direct (and disaggregated) access to services from other sites connected to the centralized control plane, without the use of complex networking architecture and protocols.

At 312 (e.g., 312A and 312B), the cloud controller 104 may second configuration request(s) to subscribe for hybrid cloud services to one or more of the SDA border 112N and/or SDA control plane 302.

At 314 (e.g., 314A and 314B), the public cloud border 112A and/or private cloud border 112B may send datacenter (DC) prefixes for SGTs to the ISE 230.

At 316, the ISE 230 may assign SGTs to the DC prefixes received from the private cloud border 112B and/or public cloud border 112A.

At 318 (e.g., 318A and 318B), the ISE 230 initiates scalable group tag exchange protocol (SXP) session(s) with the public cloud border 112A and/or private cloud border 112B. In some examples, the SXP session enables the ISE 230, public cloud border 112A, and/or private cloud border 112B to learn the prefix-SGT bindings.

At 320 (e.g., 320A and 320B), the public cloud border 112A and/or private cloud border 112B may, from the SXP session, filter the SGT to DC prefix bindings to send to an on-demand network (e.g., illustrated as LISP in FIG. 3A).

As illustrated in FIG. 3B, at 322 (e.g., 322A and 322B), the public cloud border 112A and/or private cloud border 112B may register, with the cloud control plane 102, one or more of service(s), capabilities, and DC prefixes to SGT bindings with service border as RLOC.

At 324, the cloud control plane 102 may (such as via an MSMR) aggregate the services based on capabilities. The cloud control plane 102 may additionally add the prefix-SGT bindings with EID-to-RLOC (service-etr) mappings in a database and/or memory associated with the cloud control plane 102.

At 326 (e.g., 326A, 326B, 326C, 326N), the cloud control plane 102 may send one or more service publication(s) to one or more of the public cloud border 112A, private cloud border 112B, SDA border 112N, and/or SDA control plane 302. In some examples, the service publication(s) may comprise indications of the service(s), the IP address(es), the SGT binding(s), the DC prefix(es), and/or any other suitable information. Accordingly, by proactively publishing service publications, the cloud control plane 102 reduces latency and/or delay within the network by not requiring device(s) (e.g., SDA border 112N and/or SDA control plane 302, etc.) to pull information from the cloud control plane 102 after receiving a request from a host 306.

Accordingly, the cloud control plane 102 may dynamically assign roles to one or more of the public cloud site, private cloud site, and/or SDA access site based on their capabilities and the network requirements. For instance, the cloud control plane 102 may publish (e.g., send a service publication for) each one of the onboarded sites about a series of policies to implement when offering their services to the rest of the sites within the system. For example, a service site (e.g., such as a public cloud site and/or private cloud site) may be receive a service publication from the cloud control plane 102 about the network segments to service, access policies groups to allow and/or reject, specific services to enable and/or disable, etc. In this way, the cloud control plane may enable the hybrid network to dynamically scale up or downsize cloud services based on traffic requirements in a highly granular (and cost effective) manner given the highly disaggregated nature of a network composed of service sites. Moreover, roles and policies may be dynamically added or removed by the cloud control plane 102 from each one of the service sites depending of the requirements at each instant.

At 328, the SDA access site 304 may detect a host 306. In some examples, the host 306 may comprise a host device (e.g., such as a user device). In some examples, detecting the host 306 may comprise the SDA access site 304 determining that the host 306 has logged onto the SDA access site 304.

At 330, the SDA access site 304 may download, from the ISE 230, policy associated with the host 306. In some examples, the policy includes the destination SGT's.

At 332, the host 306, sends a packet associated with a destination (e.g., public cloud border 112A and/or private cloud border 112B) to the SDA access site 304.

As illustrated in FIG. 3C, at 334, the SDA access site 304 may send, to the SDA control plane 302, a map-request indicating a DC prefix associated with a destination and/or group.

At 336, the SDA control plane may (such as via an MSMR), perform a longest prefix search. In some examples, the longest prefix search indicates whether the host has permission to access the DC prefix associated with the destination and/or group.

At 338, the SDA control plane 302 may send, to the SDA access site, a map-reply indicating either (i) "ISE assigned SGT" or (ii) "unassigned SGT". The map-reply may further include a service-etr as RLOC.

At 340, the SDA access site may populate the prefix to SGT mapping in a RBM/CTS program FIB and forwarding.

At 342, the SDA access site 304 may send the packet to the SDA border 112N and may apply policy to the packet based on whether the destination is "ISE assigned SGT" or "unassigned SGT".

At 344, the SDA border 112N forwards the packet to the public cloud border 112A if the service being accessed by the host 306 is a DC server associated with the public cloud site. The SDA border 112N and/or public cloud border 112A may forward the packet via a firewall, as per the policy.

At 346, the SDA border 112N forwards the packet to the public cloud border 112B if the service being accessed by the host 306 is a DC server associated with the private cloud site. The SDA border 112N and/or private cloud border 112B may forward the packet via a firewall, as per the policy.

Figure 4:
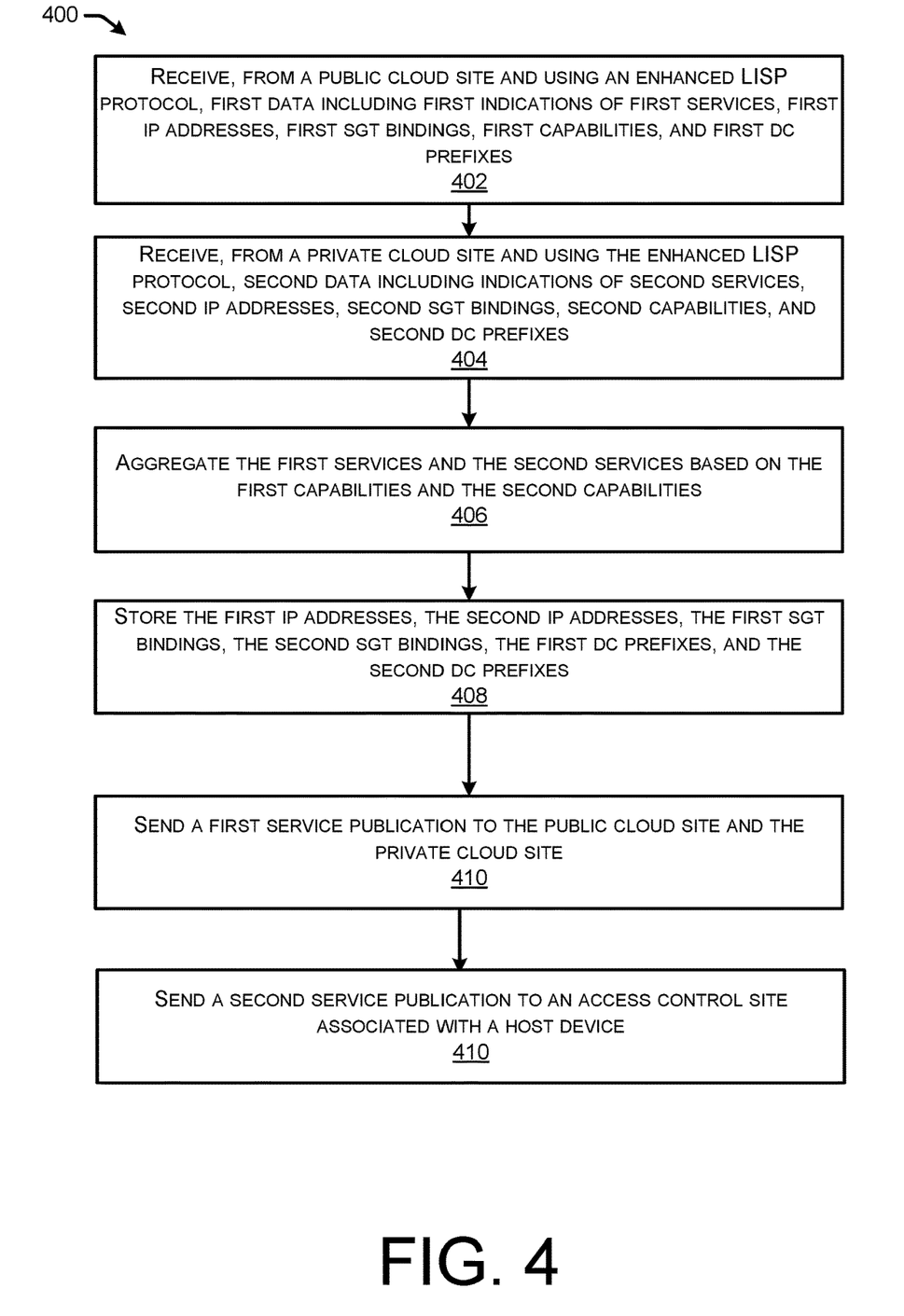
FIG. 4 illustrates a flow diagram of an example method for a cloud control plane to provide hybrid cloud services for enterprise fabric.

FIG. 4 illustrates a flow diagram of an example method 400 for a cloud control plane to provide hybrid cloud services for enterprise fabric. In some instances, the steps of method 400 may be performed by a device (e.g., cloud control plane 102, controller 104, etc.) that includes one or more processors and one or more non-transitory computer-readable media storing computer-executable instructions that, when executed by the one or more processors, cause the one or more processors to perform operations of method 400.

At 402, the cloud control plane 102 may receive, from a public cloud site and using an enhanced LISP protocol, first data including first indications of first services, first IP addresses, first SGT bindings, first capabilities, and first datacenter (DC) prefixes. For instance, the public cloud site may correspond to public cloud site 108. As noted above, the cloud control plane 102 may receive the first data using any on demand protocol (e.g., LISP, or any other suitable pull protocol). The cloud control plane 108 may register and store the first data using the techniques described above.

At 404, the cloud control plane 102 may receive, from a private cloud site and using the enhanced LISP protocol, second data including second indications of second services, second IP addresses, second SGT bindings, second capabilities, and second DC prefixes. For instance, the public cloud site may correspond to private cloud site 116. As noted above, the cloud control plane 102 may receive the second data using any on demand protocol (e.g., LISP, or any other suitable pull protocol). The cloud control plane 108 may register and store the second data using the techniques described above.

At 406, the cloud control plane 102 may aggregate the first services and the second services based on the first capabilities and the second capabilities. For instance, the cloud control plane 102 may aggregate the first services and the second services using the aggregation component described above. Additionally or alternatively, aggregation may comprise adding the prefix-SGT bindings with EID-to-RLOC (service-etr) mappings in a database and/or memory associated with the cloud control plane 102.

At 408, the cloud control plane 102 may store, in a database, the first IP addresses, the second IP addresses, the first SGT bindings, the second SGT bindings, the first DC prefixes, and the second DC prefixes. Additionally or alternatively, aggregation may comprise adding the prefix-SGT bindings with EID-to-RLOC (service-etr) mappings in a database and/or memory associated with the cloud control plane 102. In some examples, the cloud control plane may store additional information (e.g., such as state information, or any other registered information described herein in the database and/or memory).

At 410, the cloud control plane 102 may send a first service publication to the public cloud site and the private cloud site. In some examples, the first service publication comprises at least the first services, the second services, the first IP addresses, the second IP addresses, the first SGT bindings, the second SGT bindings, the first DC prefixes, and the second DC prefixes.

In some examples, the cloud control plane 102 may publish (e.g., send a service publication for) each one of the onboarded sites about a series of policies to implement when offering their services to the rest of the sites within the system. For example, a service site (e.g., such as a public cloud site and/or private cloud site) may be receive a service publication from the cloud control plane 102 about the network segments to service, access policies groups to allow and/or reject, specific services to enable and/or disable, etc.

At 412, the cloud control plane 102 may send a second service publication to an access control site associated with a host device. In some examples, the second service publication comprises at least the first services, the second services, the first IP addresses, the second IP addresses, the first SGT bindings, the second SGT bindings, the first DC prefixes, and the second DC prefixes. In some examples, the access control site associated with the host device comprises a SDA site, a SDN site, and/or a wide area access site.

Figure 5:
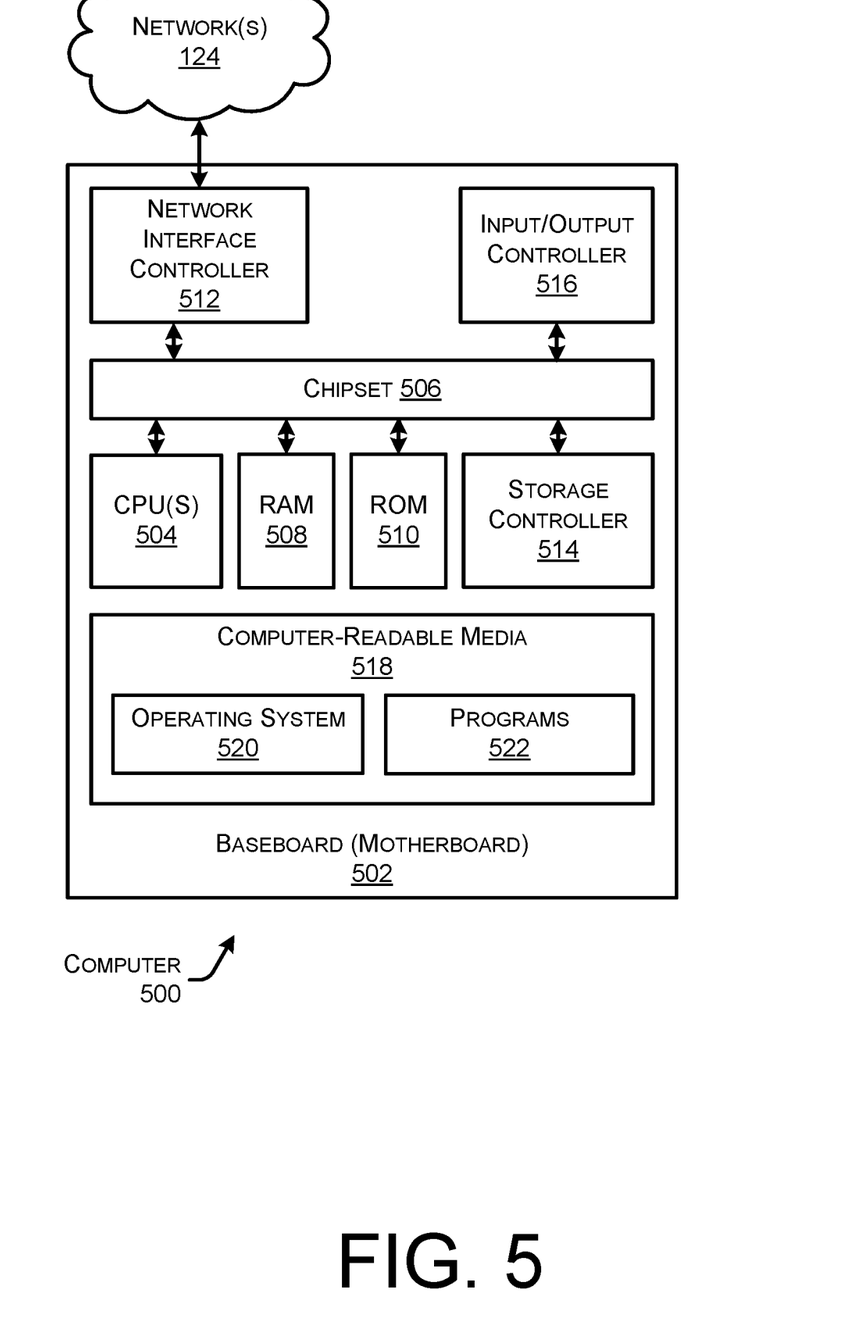
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a cloud control plane 102, a controller 104, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as SDA/SDN network(s) 120, network(s) 124, and/or any other network described herein. The chipset 506 can include functionality for providing network connectivity through a NIC 512, such as a gigabit Ethernet adapter. The NIC 512 is capable of connecting the computer 500 to other computing devices over the SDA/SDN network(s) 120, network(s) 124, and/or any other network described herein. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the cloud control plane 102, the controller 104, and/or any components included therein, may be supported by one or more devices similar to computer 500. Stated otherwise, some or all of the operations performed by the cloud control plane 102, the controller 104, and or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD- ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a cloud control plane 102, a controller 104, and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the cloud control plane 102, the controller 104, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques for providing hybrid cloud services for an enterprise fabric including: receiving, from a public cloud site and using an enhanced LISP protocol, first data including first indications of first services, first IP addresses, first SGT bindings, first capabilities, and first datacenter (DC) prefixes and receiving, from a private cloud site and using the enhanced LISP protocol, second data including second indications of second services, second IP addresses, second SGT bindings, second capabilities, and second DC prefixes; aggregating the first services and the second services based on the first capabilities and the second capabilities; storing, in a database, the first IP addresses, the second IP addresses, the first SGT bindings, the second SGT bindings, the first DC prefixes, and the second DC prefixes; sending a first service publication to the public cloud site and the private cloud site; and sending a second service publication to an access control site associated with a host device.

In this way, a hybrid cloud control plane can provide a centralized, cloud based management and cloud based service-control-plane, which provides, among others, a highly scalable centralized service-control-plane functionality that enables offloading complex control-plane functions from all networking units and provides consistent policy functions to all of them (regardless of type and size). Moreover, the described techniques provide simplified forwarding in servers. That is, by utilizing a pull based protocol (e.g., such as LISP) and including xTRs and/or functionality of border devices on the servers (e.g., such as using DPUs, smartNICs, and/or other forwarding engine), the end-host system that the servers are part of are exposed to the rest of the network as highly disaggregated private/public cloud entities. Accordingly, in this way, services provided by servers are not subject to the aggregation and/or structural limitations of the datacenter/cloud environment they are running in, and can be assimilated into the whole system with consistent rules and policies.

Additionally, the described techniques enable integrated network environments (e.g., such as enterprise SDA, extended access networks, and/or IoT access networks). For instance, other systems and/or servers may treat the cloud control plane as part of a transit site and/or be onboarded as part of a scaled out network design. That is, with the described architecture, these integrated systems may see the services offered by the servers as part of a common flat system, without the need to account for policy exchanges between separate domains as well as without worrying about converging optimized routing paths/prefixes with security groups assignments of the servers/hosts.

Furthermore, the claimed techniques provide consistent and repeatable service distribution and applications. For instance, the hybrid cloud services and network services such as firewalls may be highly reproduced and scaled, since the cloud services and/or network services may be implemented and replicated at any point of the highly disaggregated architecture described herein and enabled by simplified forwarding (e.g., such as using xTR, DPUs, and/or smartNIC, and an on-demand protocol (e.g., such as LISP or any other suitable pull-based protocol).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a cloud control plane, the method comprising:
   receiving, from a public cloud site and using an enhanced LISP protocol, first data including first indications of first services, first IP addresses, first SGT bindings, first capabilities, and first datacenter (DC) prefixes;
   receiving, from a private cloud site and using the enhanced LISP protocol, second data including second indications of second services, second IP addresses, second SGT bindings, second capabilities, and second DC prefixes;
   aggregating the first services and the second services based on the first capabilities and the second capabilities;
   storing, in a database, the first IP addresses, the second IP addresses, the first SGT bindings, the second SGT bindings, the first DC prefixes, and the second DC prefixes;
   sending a first service publication to the public cloud site and the private cloud site; and
   sending a second service publication to an access control site associated with a host device.

2. The method of claim 1, wherein the first service publication comprises at least the first services, the second services, the first IP addresses, the second IP addresses, the first SGT bindings, the second SGT bindings, the first DC prefixes, and the second DC prefixes.

3. The method of claim 1, wherein the public cloud site comprises at least one data center server associated with a service provided by a service provider.

4. The method of claim 1, wherein the access control site comprises an SDA or an SDN site.

5. The method of claim 1, wherein the access control site comprises an extended access wireless network.

6. The method of claim 1, wherein the first data is received from the public cloud site using a smartNIC server.

7. The method of claim 1, wherein the first capabilities or the second capabilities are associated with protocols enabled on servers within the public cloud site or the private cloud site.

8. A system comprising:
   one or more processors; and
   one or more non-transitory computer-readable media storing computer-executable instructions that, when executed by the one or more processors, cause the one or more processors to perform operations comprising:
      receive, from a public cloud site and using an enhanced LISP protocol, first data including first indications of first services, first IP addresses, first SGT bindings, first capabilities, and first datacenter (DC) prefixes;
      receive, from a private cloud site and using the enhanced LISP protocol, second data including second indications of second services, second IP addresses, second SGT bindings, second capabilities, and second DC prefixes;
      aggregate the first services and the second services based on the first capabilities and the second capabilities;
      store, in a database, the first IP addresses, the second IP addresses, the first SGT bindings, the second SGT bindings, the first DC prefixes, and the second DC prefixes;
      send a first service publication to the public cloud site and the private cloud site; and
      send a second service publication to an access control site associated with a host device.

9. The system of claim 8, wherein the first service publication comprises at least the first services, the second services, the first IP addresses, the second IP addresses, the first SGT bindings, the second SGT bindings, the first DC prefixes, and the second DC prefixes.

10. The system of claim 8, wherein the public cloud site comprises at least one data center server associated with a service provided by a service provider.

11. The system of claim 8, wherein the access control site comprises an SDA or an SDN site.

12. The system of claim 8, wherein the access control site comprises an extended access wireless network.

13. The system of claim 8, wherein the first data is received from the public cloud site using a smartNIC server.

14. The system of claim 8, wherein the first capabilities or the second capabilities are associated with protocols enabled on servers within the public cloud site or the private cloud site.

15. One or more non-transitory computer-readable media storing computer-readable instructions that, when executed by one or more processors, cause the one or more processors to perform operations comprising:
   receiving, from a public cloud site and using an enhanced LISP protocol, first data including first indications of first services, first IP addresses, first SGT bindings, first capabilities, and first datacenter (DC) prefixes;
   receiving, from a private cloud site and using the enhanced LISP protocol, second data including second indications of second services, second IP addresses, second SGT bindings, second capabilities, and second DC prefixes;
   aggregating the first services and the second services based on the first capabilities and the second capabilities;
   storing, in a database, the first IP addresses, the second IP addresses, the first SGT bindings, the second SGT bindings, the first DC prefixes, and the second DC prefixes;
   sending a first service publication to the public cloud site and the private cloud site; and
   sending a second service publication to an access control site associated with a host device.

16. The one or more non-transitory computer-readable media of claim 15, wherein the access control site comprises an SDA or an SDN site.

17. The one or more non-transitory computer-readable media of claim 15, wherein the first capabilities or the second capabilities are associated with protocols enabled on servers within the public cloud site or the private cloud site.

18. The one or more non-transitory computer-readable media of claim 15, wherein the first data is received from the public cloud site using a smartNIC server.

19. The one or more non-transitory computer-readable media of claim 15, wherein the access control site comprises an extended access wireless network.

20. The one or more non-transitory computer-readable media of claim 15, wherein the first service publication comprises at least the first services, the second services, the first IP addresses, the second IP addresses, the first SGT bindings, the second SGT bindings, the first DC prefixes, and the second DC prefixes.

\* \* \* \* \*